United States Patent [19]

Gill et al.

[11] Patent Number: 4,642,001

[45] Date of Patent: Feb. 10, 1987

[54] SPADE DRILL WITH REPLACEABLE CUTTING-INSERT CARRIER

[76] Inventors: Geoffrey Y. Gill, Rte. #3, Box #140, Hart, Mich. 49420; Paul H. Hunter, 2356 Norcrest, Muskegon, Mich. 49441; Gerard W. Venlet, 2140 Lakeridge Dr., Holland, Mich. 49423

[21] Appl. No.: 547,469

[22] Filed: Oct. 31, 1983
(Under 37 CFR 1.47)

[51] Int. Cl.$^4$ ............................................. B23B 27/10
[52] U.S. Cl. .......................................... 408/59; 279/20; 407/11; 408/226; 408/229; 408/233; 408/713
[58] Field of Search ............... 408/223, 226, 227, 228, 408/229, 231, 713, 224, 230, 232, 233, 59, 186, 189, 199, 206, 238, 239 R, 239 A, 241 R, 57, 60; 279/20; 407/11

[56] References Cited

U.S. PATENT DOCUMENTS

| | | | |
|---|---|---|---|
| 1,104,989 | 7/1914 | Hanson | 408/59 |
| 2,076,663 | 4/1937 | Miller | 408/231 X |
| 2,575,239 | 11/1951 | Stephens | 408/226 X |
| 2,640,378 | 6/1953 | Haggar | 408/226 X |
| 3,293,727 | 12/1966 | Simms | 407/11 |
| 3,364,800 | 1/1968 | Benjamin et al. | 408/59 X |
| 4,040,764 | 8/1977 | Baturka | 408/226 X |
| 4,047,826 | 9/1977 | Bennett | 408/59 |
| 4,060,335 | 11/1977 | Holloway et al. | 408/233 |
| 4,120,601 | 10/1978 | Benjamin | 408/223 X |
| 4,190,125 | 2/1980 | Emmerich et al. | 408/226 X |
| 4,268,198 | 5/1981 | Peters | 408/713 X |
| 4,293,252 | 10/1981 | Kress et al. | 408/713 X |
| 4,303,358 | 12/1981 | Grusa | 408/713 X |
| 4,367,991 | 1/1983 | Grafe et al. | 408/713 X |
| 4,573,836 | 3/1986 | Andersson | 408/57 X |

FOREIGN PATENT DOCUMENTS 677825 8/1979 U.S.S.R. ............................... 408/59

Primary Examiner—Gil Weidenfeld
Assistant Examiner—Glenn L. Webb
Attorney, Agent, or Firm—Glenn B. Morse

[57] ABSTRACT

This spade drill has an elongated holder with a standard driving configuration at one end, and adapted at the axially opposite end to receive a carrier block provided with receptacles for receiving indexable standard cutting inserts of extremely hard alloy.

1 Claim, 8 Drawing Figures

SPADE DRILL WITH REPLACEABLE CUTTING-INSERT CARRIER

BACKGROUND OF THE INVENTION

Holes of intermediate diameter are usually produced in solid materials by the use of either twist or spade drills. Drill performance is vastly improved by the use of cutting inserts of extremely hard alloy, and these are difficult to install and maintain on the usual twist drill. The spade drill has no helical configuration, and therefore can make practical use of the so-called indexable insert that provides four cutting edges around the periphery of a square configuration. Any one of these edges can be positioned to do the cutting, and a central hole in the insert provides for a fastening holding the insert in a recess in a close fit.

Problems develop when one of these relatively brittle inserts cracks, and then presents a blunt surface to the material being cut. Heavy torque and axial feed forces quickly damage the relatively expensive tool holder. The cost of these holders also inhibits the use of large numbers of these drills, which are otherwise the most economical devices for hole production in the diameter ranges where the indexable inserts can be accommodated. The performance and characteristics of this type of drill is discussed in the April, 1979, issue of MODERN MACHINE SHOP, beginning at Page 84.

SUMMARY OF THE INVENTION

The present invention provides an insert carrier block receivable in the end of a tool holder, and positioned solidly to locate the inserts for the best cutting action during the heavy application of torque and thrust forces involved in the drilling procedure. These blocks are relatively small, and are more expendable than the holders. This allows the use of a number of the carrier blocks with the same holder to make available a number of hole diameters. The configuration of the block, and that of the holder end receiving it, is established to give full freedom of chip passage and coolant flow. Locating through interengaging surfaces on these members, with fastenings relied upon solely to maintain the interengagement.

DESCRIPTION OF THE PREFERRED EMBODIMENT

Figure 1:
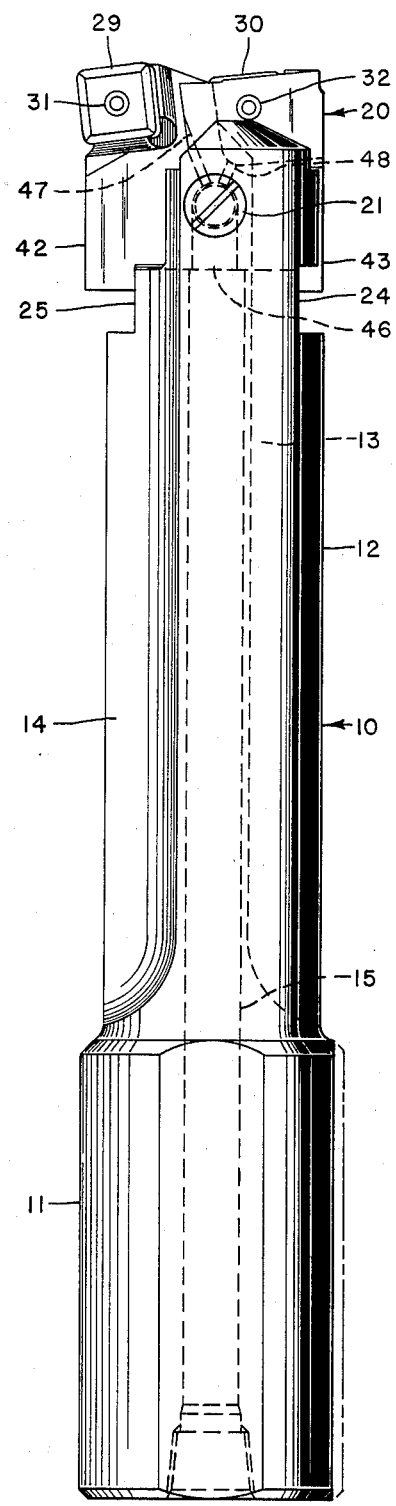
FIG. 1 is a side elevation of the complete tool including the holder and the carrier equipped with cutting inserts.
Figure 2:
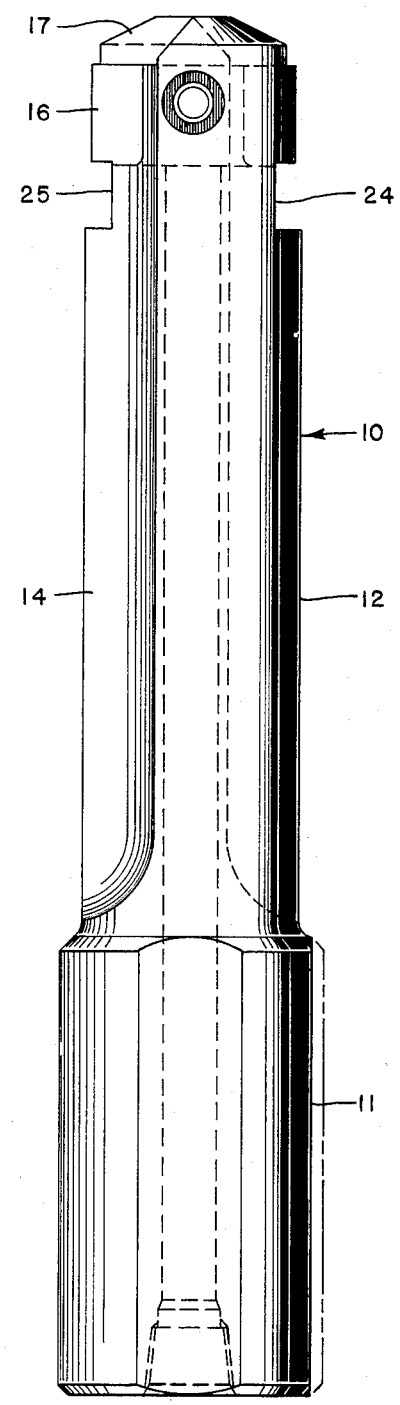
FIG. 2 is a side elevation of the holder alone.
Figure 3:
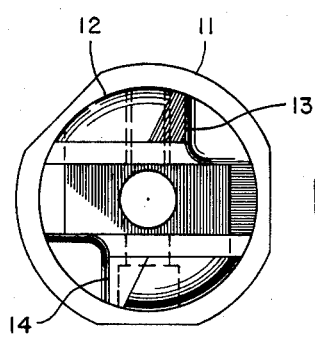
FIG. 3 is an end view of the holder appearing in FIG. 2.

The spade drill assembly shown in FIG. 1 includes the holder 10 with the enlarged chuckling portion 11 and the cantilever extension 12. Opposite sides of this extension are provided with the usual grooves 13 and 14, respectively, to provide passageways for the axial flow of coolant and chips from the cutting operation. The coolant is supplied, from the machine carrying and driving the drill, through the central axial passageway 15.

Figure 7:
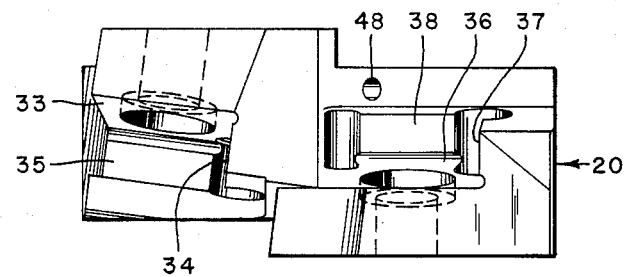
FIG. 7 is a top view of the carrier, in projection with FIG. 6.
Figure 5:
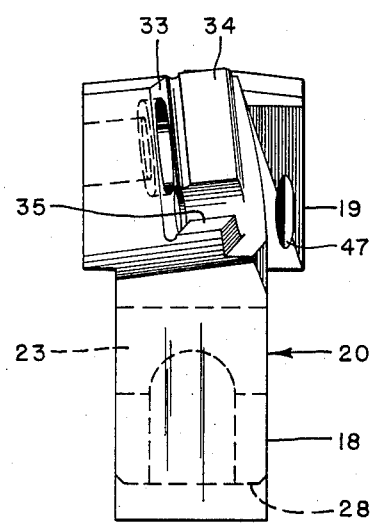
FIG. 5 is a side view of the insert carrier block, with the inserts removed.
Figure 6:
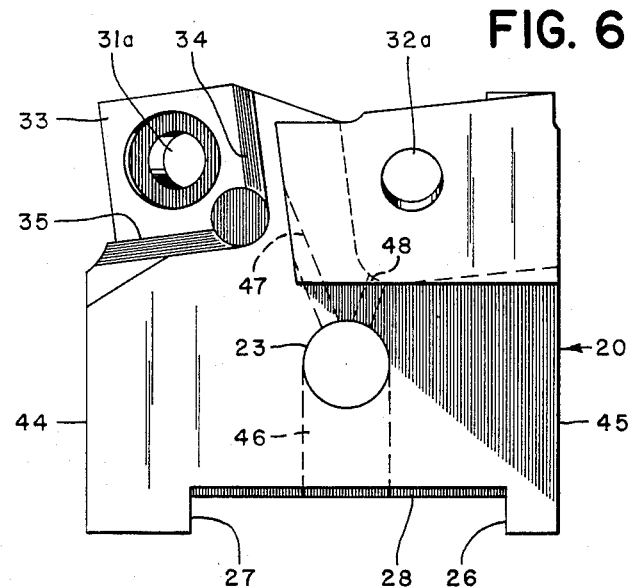
FIG. 6 is a plan view of the carrier shown in FIG. 5.

The outer extremity of the cantilever portion 12 of the tool is provided with a diameteral slot having the narrow portion 16 and the wider outer portion 17 respectively receiving the portions 18 and 19 of the carrier block 20 shown in FIGS. 5-7. A screw 21 traverses the diameteral hole 22 in the cantilever portion 12 of the tool, and also the hole 23 in the block 20 to maintain the engagement of the block with the tool holder. A pair of opposite flats 24 and 25 on the cantilever portion 12 provides spaced flat surfaces engageable with the surfaces 26 and 27, which (together with the transverse surface 28) define a recess in the block 20. The surfaces 26 and 27 are responsible for the lateral alignment of the block 20 with respect to the axis of rotation of the tool, and the surface 28 transfer the thrust involved in the cutting operation. These forces are thus transferred by interengaging surfaces on the block and on the tool holder that can be machined to close tolerances, and free the screw 21 of the necessity of transferring these forces.

The primary function of the block 20 is to carry the cutting inserts 29 and 30, and support them solidly in the best position to perform their functions. These inserts are of standard square configuration, and are usually made of tungsten carbide marketed under various trademarks. Each of these standard inserts has a central hole which is usually traversed by an eccentric pin as shown at 31 and 32. The diameter of such a pin where it traverses the inserts is slightly eccentric to the diameter that traverses the corresponding hole 31a and 32a in the carrier block 20, with the net effect that rotation of these pins has a strong tendency to force the insert into the convergence of the walls defining the edges of the recesses in the block 20 provided for this purpose. The slight degrees of eccentricity that are involved are such that the coefficient of friction will maintain the adjusted position under the conditions involved in the cutting operation. In summary, the function of these pins is merely to hold the inserts in assembled relationship with the "pockets" in the block 20, with the forces being transferred by the engagement of the insert with the walls defining the pocket.

Figure 8:
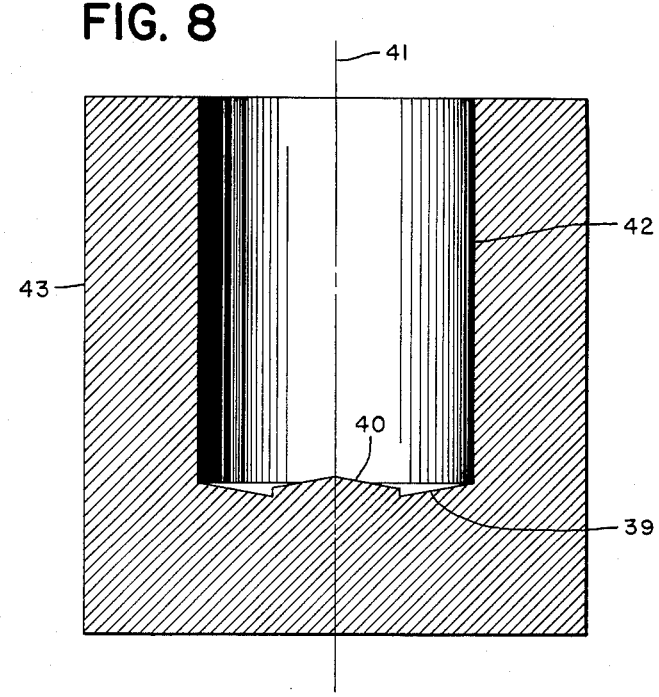
FIG. 8 is a sectional view showing a sample of material drilled with a tool as shown in FIG. 1.
Figure 4:
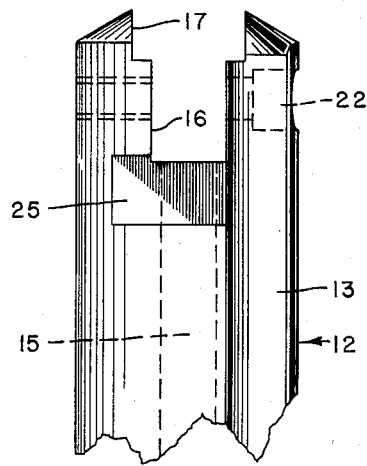
FIG. 4 is a side elevation of the outer end of the holder, rotated 90° about the axis of the tool from the FIG. 2 position.

The "pocket" receiving the insert 29 is defined by the surfaces 33–35 in the block 20, and the insert 30 is received by the "pocket" defined by the opposite set of surfaces 36–38. The placement of these pocket surfaces is critical to the cutting action of the inserts 29 and 30. These inserts are disposed so that they cut different portions of the diameter of the hole. Referring to FIG. 8, the outer insert 29 is responsible for machining the portion 39, and the inner insert 30 for machining the portion 40. The exposed cutting edges of the inserts 29 and 30 are generally parallel, but are on opposite sides of the axis of rotation of the tool. This obviously results in the machining of conical surfaces having an opposite inclination with respect to the axis 41 of the hole 42 in the work piece 43. The relative axial positions of the inserts 29 and 30 established by their respective pockets should be such that there is a relatively small degree of axial discontinuity between these conical surfaces. Some authorities recommend that the inner insert 30 function slightly axially in advance of the outer insert 29, but applicant's experience has been that this is not necessary. A tool producing the configuration in FIG. 8 seems to have very desirable performance characteristics.

The placement of the carrier block 20 by the holder slot 16-17 is such that the flow of chips and coolant along the grooves 13-14 is not only unobstructed, but facilitated. The block tends to sweep the drilled area clear continually, since its lateral edges 44 and 45—particularly the edge 44—tends to sweep the bore clear as the tool rotates, and thus inhibit any tendency of the chips to pack and obstruct the flow along the holder grooves 13 and 14. The flow of coolant to the points of operation of the inserts 29 and 30 follows through the central passage 46 in the block 20 functioning as an extension of the coolant passage 15 in the tool holder. From this point, lateral diverging branches as shown at 47 and 48 lead to points of exhaust of coolant immediately adjacent the point where the cutting action is taking place. The passage 46 is larger in diameter than that of the screw 21, thus permitting the flow around the screw 21. The placement of the inner insert 30 is such that its cutting edge traverses the axis of rotation of the tool, and the swept area of the outer insert 29 has at least a slight degree of overlap over that of the inner insert 30. The particular angular relationships of cutting edges and the orientation of the inserts is established by standard data available to the manufacturers and users of these tools.

We claim:

1. A drilling tool comprising:
    a cantilever holder having axial chip grooves formed by surfaces extending along opposite sides thereof, said holder having a diametral recess across the end thereof, said holder also having a mounting portion establishing an axis of rotation;
    a blade body receivable in said recess, and having abutments engageable with surfaces on said holder transverse to said groove surfaces to position said body laterally with respect to said holder, said body having receptacles for receiving cutting inserts, said receptacles being disposed to position said cutting inserts at locations on opposite sides of said axis of rotation and eccentric with respect to each other about said axis, one of said receptacles being disposed to position a cutting insert to cut to the said axis of rotation, and said receptacles establish cutting insert positions wherein the cutting edges of said inserts are parallel to each other and inclined to said axis of rotation; and
    cross-pin means interengageable with said blade body and holder to maintain the assembled relationship thereof, said holder having a central axial bore providing a coolant passage extending to said recess, and said blade body having a transverse hole receiving said cross-pin means, a first passage terminating at said hole and communicating with said coolant passage of said holder and extension passages terminating at said transverse hole and disposed to deliver coolant to positions adjacent said receptacles, said cross-pin means intersecting said transverse hole with clearance providing for coolant flow around said cross-pin means.

* * * * *